United States Patent [19]

Rauen, Jr.

[11] 4,324,363
[45] Apr. 13, 1982

[54] HEADLAMP WASHER ASSEMBLY HAVING A MULTIPORTED FLOW VALVE

[75] Inventor: John T. Rauen, Jr., Troy, Mich.

[73] Assignee: C-D Marketing Ltd., Ann Arbor, Mich.

[21] Appl. No.: 183,191

[22] Filed: Sep. 2, 1980

Related U.S. Application Data

[63] Continuation of Ser. No. 941,368, Sep. 11, 1978, abandoned.

[51] Int. Cl.³ .............................. B60S 1/56; B60S 1/50
[52] U.S. Cl. ............................. 239/284 A; 15/250 A; 222/4; 222/148; 222/373
[58] Field of Search ............. 222/4, 148, 57, 61, 222/373, 400.7, 399; 239/284 R, 284 A, 373; 137/209; 15/250 A, 250.01

[56] References Cited

U.S. PATENT DOCUMENTS

| | | | |
|---|---|---|---|
| 2,780,491 | 2/1957 | Gauthier et al. | 239/373 X |
| 3,113,704 | 12/1963 | Fingeroot | 222/373 |
| 3,169,676 | 2/1965 | Hanselmann | 222/373 |
| 3,286,932 | 11/1966 | Kibler | 239/284 |
| 3,414,317 | 12/1968 | Mortimer | 239/284 X |
| 4,026,468 | 5/1977 | Tinder et al. | 239/284 R X |
| 4,044,953 | 8/1977 | Vogel | 239/284 A X |

Primary Examiner—Robert J. Spar
Assistant Examiner—Fred A. Silverberg
Attorney, Agent, or Firm—Olsen and Stephenson

[57] ABSTRACT

A headlamp washing assembly including spray nozzles disposed above automotive headlamps. A liquid storage reservoir stores cleaning liquid to be dispensed by the nozzles and is disposed above the nozzles to provide a gravity feed of the liquid from the reservoir to the nozzles. A gas storage tank stores gas supplied to it from a source and supplies the pressurized gas to force the liquid through the nozzles. A solenoid actuated valve is in communication with the liquid storage reservoir, the gas storage tank, the source of pressurized gas and the nozzles through appropriate conduits. The valve has a first position for charging the gas storage tank from the source of gas while simultaneously charging the metering conduits leading to the nozzles with liquid from the liquid storage tank. The valve has a second position for subjecting the metering conduits to gas from the gas storage tank to force liquid through the conduits and out the nozzles.

14 Claims, 2 Drawing Figures

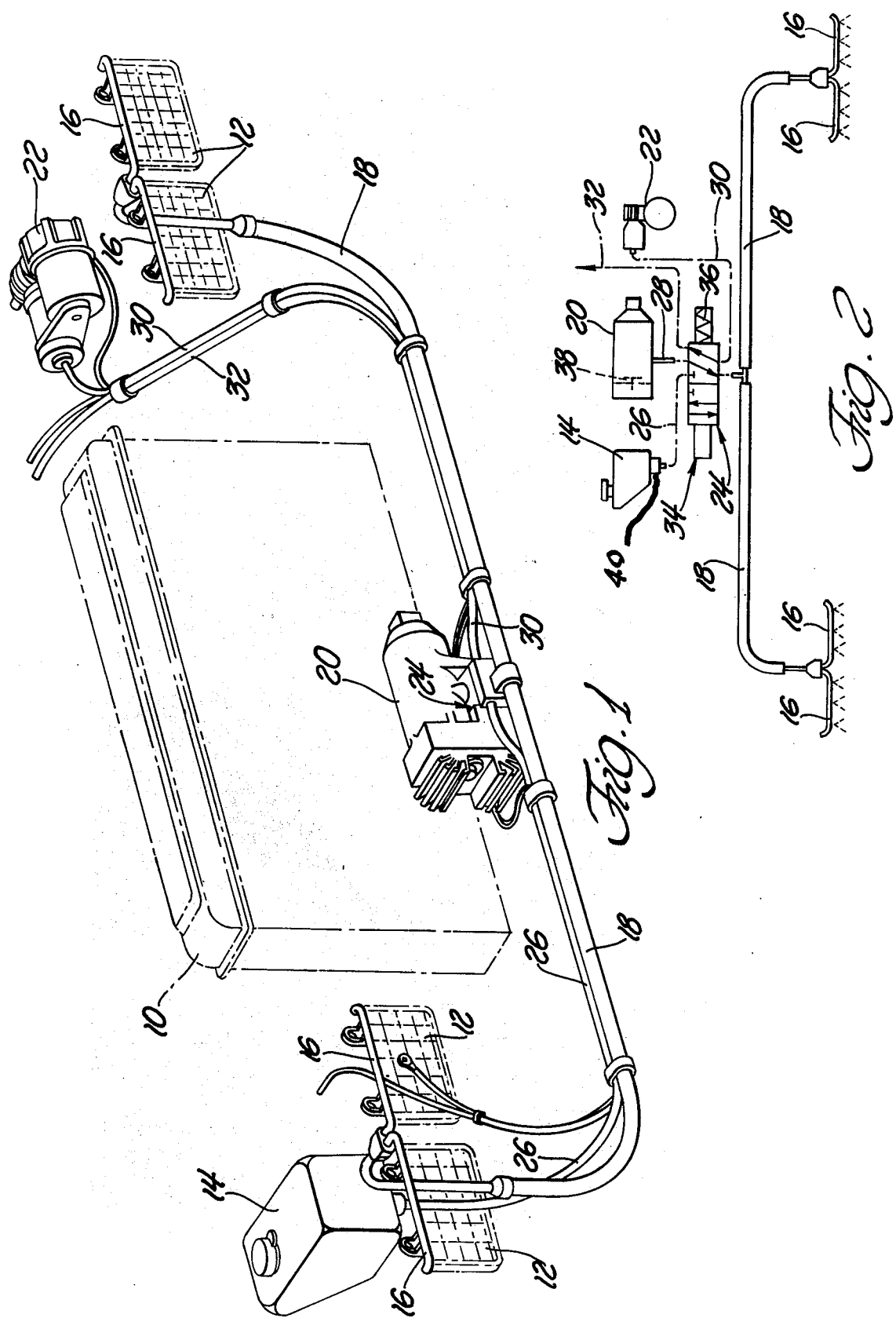

HEADLAMP WASHER ASSEMBLY HAVING A MULTIPORTED FLOW VALVE

This application is a continuation of application Ser. No. 941,368, filed Sept. 11, 1978, now abandoned.

BACKGROUND OF THE INVENTION (1) Field of the Invention

The subject invention relates to a fluid dispensing assembly and one particularly suited for cleaning headlamps in an automotive vehicle. The headlamp cleaning assembly is of the type having nozzles for spraying liquid upon the headlamps of a vehicle and which also utilizes a compressed gas such as air for forcing the liquid out through the spray nozzles.

(2) Description of the Prior Art and Prior Art Statement

Various systems have been developed which utilize a liquid and a compressed gas such as air for cleaning the headlamps or windshields of automotive vehicles. Such systems typically include various valves and control systems. One such system for cleaning windshields is shown in U.S. Pat. No. 3,169,676 to Hanselmann granted Feb. 16, 1965. That system includes an air tank connected to a source of air under pressure and also in communication with a metering chamber disposed beneath a liquid reservoir. One valve controls the flow of pressurized air into and out of the air tank and another valve is associated with the metering chamber to control the flow of liquid into the metering chamber and the flow of pressurized air into the metering chamber. In the system shown in this patent the metering chamber is precharged before the air tank is charged and there is requirement for a plurality of valves. Further, there is no control for determining the amount of air pressure in the air storage tank and there is no provision for assuring that the liquid dispensing lines will be completely purged of liquid.

SUMMARY OF THE INVENTION

A fluid dispensing assembly including liquid storage means for storing liquid, gas storage means for storing a predetermined volume of gas, a gas source for charging the gas storage means, dispensing means for containing a predetermined quantity of dispensing liquid and for dispensing the liquid over a predetermined area with valve means in fluid communication with the liquid storage means, the gas storage means, the gas source and the dispensing means for charging the gas storage means from the gas source while simultaneously charging the dispensing means with dispensing liquid from the liquid storage means when in a first position and for discontinuing the charging of the gas storage means and the dispensing means while simultaneously subjecting the dispensing means to gas from the gas storage means to force the dispensing liquid through the dispensing means when in a second position.

BRIEF DESCRIPTION OF THE DRAWINGS

FIG. 1 is a perspective view showing a preferred embodiment of the subject invention; and FIG. 2 is a schematic illustration of the preferred embodiment.

DESCRIPTION OF THE PREFERRED EMBODIMENT

A fluid dispensing assembly in the form of a headlamp washing assembly is shown in an operative environment in FIG. 1 and schematically in FIG. 2. The assembly is shown as it would be disposed relative to a radiator 10 and the headlamps 12 (both shown in phantom) of an automotive vehicle.

The assembly includes a liquid storage means comprising a reservoir 14 for storing cleaning liquid to be dispensed. Also included are dispensing means comprising the nozzles 16 and the associated metering conduits 18 for containing a predetermined quantity of dispensing liquid and for dispensing or directing liquid over a predetermined area of the headlamps 12. The reservoir 14 would contain a special liquid solution which would be nonfreezing and include additives to enable it to remove caked on or baked on road scum from the headlamps 12.

The assembly also includes gas storage means comprising a gas storage tank 20 for storing a predetermined volume of gas which, in the preferred embodiment, would be pressurized air utilized to force the liquid through the conduits 18 and the nozzle 16. Also included is a gas source or a source of gas 22 for charging the storage tank 20 with pressurized air, i.e., the source of gas 22 supplies pressurized air to the gas storage tank 20. The source of gas 22 is an air compressor of the type utilized on automotive vehicles having a load leveler system utilizing compressed air.

The gas storage tank 20 is associated with a valve means generally indicated at 24 but shown separately in the schematic version of FIG. 2. The valve means 24 comprises a multi-ported valve. A first port in the valve 24 is in communication with the liquid storage reservoir 14 through the line or conduit 26. A second port of the valve 24 is in communication with the gas storage tank 20 through a line or conduit 28, as illustrated in FIG. 2. A third port of the valve 24 is in communication with the source of gas or compressor 22 through a line or conduit 30. A fourth port in the valve 24 is in communication with the nozzles 16 through the conduits 18. The valve 24 has yet another port in fluid communication with a line or conduit 32 which leads to the load levelling system utilized in the vehicle.

The valve means 24 is, therefore, in fluid communication with the liquid storage reservoir 14, the gas storage tank 20, the source of pressurized gas or air from the compressor 22, and the dispensing means or nozzles 16. The valve means 24 charges the gas storage tank 20 from the gas source 22 while simultaneously charging the dispensing means comprising the metering conduits 18 and nozzles 16 with dispensing liquid from the liquid storage tank 14 when in a first position. Thereafter, the valve means 24 discontinues the charging of the gas storage tank 20 and the charging of the conduits 18 and nozzles 16 while simultaneously subjecting the conduits 18 and nozzles of the dispensing means to pressurized gas from the gas storage tank 20 to force the dispensing liquid through the lines or conduits 18 and the nozzles 16 of the dispensing means when in a second position.

There is also included a control means comprising a solenoid generally indicated at 34 in FIG. 2 which has a spring 36 associated therewith for controlling the movement of the valve between the first and second positions. Further, there is included a sensing means comprising a pressure switch 38 illustrated in FIG. 2 for sensing the pressure of the gas within the gas storage tank 20 as it is being charged for providing a signal to the solenoid 34 to move the valve from the first position to the second position.

The valve 24 is a single or unitary multi-ported valve. As illustrated in FIG. 1, the electrical switches, the pressure switch 38, a pressure relief valve, valve 24 and the solenoid 34 and associated spring 36 along with the air storage tank 20 are all incorporated and enclosed in a single unit.

As illustrated schematically in FIG. 2, the valve 24 is in the second position where the gas storage tank 20 is in communication with the metering conduits 18 and nozzles 16 with the source of compressed gas or air 22 being in communication with the load leveler system through the conduit 32. This is the normal position of the solenoid valve 34, or said another way, the off or deenergized position. The control means will include an appropriate switch for supplying current to the solenoid, which switch may be, in turn, activated automatically by the windshield washer control or may be actuated when the headlamps are turned on or there may be a separate headlamp washer control. The liquid storage reservoir 14 is disposed above the conduits 18 and the nozzles 16 so that the metering conduits 18 may be charged with liquid moving under the force of gravity from the liquid storage tank 14 and into the conduits 18. When the solenoid is actuated to be moved to the first position the conduit 26 will be in fluid communication through the valve 24 with the conduits 18 whereby the conduits 18 will fill with a predetermined amount of dispensing liquid under the force of gravity from the liquid storage tank 14. Simultaneously, the pressurized gas from the line 30 from the gas source of pressurized gas 22 will be in fluid communication with the conduit 28 leading to the gas storage tank 20. Thus, the gas storage tank 20 will be charged as a predetermined amount of liquid which flows under the force of gravity from the liquid storage tank 14 and into the metering conduits 18.

In the preferred embodiment, the liquid storage tank 14 is approximately one gallon in capacity and the conduits 18, which may be referred to as metering tubes, hold two and one-half ounces of solution or dispensing liquid in each conduit or metering tube. Each metering tube 18 is connected to two spray nozzles 16, providing one and one-quarter ounces of solution or dispensing liquid to each nozzle 16. In order to calibrate or otherwise control the rate of flow of liquid from the tank 14 to the metering tubes 18, a flow control valve 40 is disposed beneath the tank 14 and in the flow line 26 to the metering tubes 18. The flow control valve 40 may be a manually adjustable valve which may be adjusted to the desired setting for controlling or changing the rate of flow of liquid from the liquid storage tank 14 to provide the desired amount of liquid in the metering tubes in the time it takes for the gas storage tank 20 to reach the predetermined pressure at which the pressure switch 38 is activated.

The gas storage tank 20 is approximately of thirty (30) cubic inch capacity and will be pressurized to 100 psi before the pressure switch 38 closes. This will result in a 60 psi force at the spray nozzles 16 as the last of the solution in the conduits 18 is expelled through the nozzles 16. The remaining volume of air in the storage tank 20 is exhausted through the nozzles 16 and assists in an air dry-off of the headlamps 12 while purging the line 16 of any residual solution. There is a pressure relief valve not shown which would relieve the pressure in the storage tank 20 at approximately 110 psi. Pressurized air from the compressor 22 charges the gas storage tank 20 to a 100 psi in approximately fifteen seconds. This fifteen second time interval permits a predetermined amount of dispensing solution or liquid from the storage reservoir 14 to fill the metering tubes or conduits 18. At the end of fifteen seconds the pressure switch 38 is activated to open its electrical contacts breaking the circuit discontinuing current flow to the solenoid 34 whereby the spring 36 moves the solenoid to the second position illustrated in FIG. 2 allowing pressurized gas from the storage tank 20 to flow through the metering tubes or conduits 18. The assembly remains in the deactivated condition illustrated in FIG. 2 until it is again reactivated or resequenced.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A fluid dispensing assembly comprising: liquid storage means for storing liquid; gas storage means for storing a predetermined volume of gas; a gas source for charging said gas storage means; dispensing means for containing a predetermined quantity of dispensing liquid and for dispensing the liquid over a predetermined area; valve means in fluid communication with said liquid storage means, said gas storage means, said gas source and said dispensing means for charging said gas storage means from said gas source while simultaneously charging said dispensing means with said dispensing liquid from said liquid storage means when in a first position and for discontinuing said charging of said gas storage means and said dispensing means while simultaneously subjecting said dispensing means to gas from said gas storage means to force said dispensing liquid through said dispensing means when in a second position.

2. An assembly as set forth in claim 1 wherein said valve means comprises a single multi-ported valve having a first port in communication with said liquid storage means, a second port in communication with said gas storage means, a third port in communication with said gas source and a fourth port in communication with said dispensing means.

3. An assembly as set forth in claim 2 including sensing means for sensing the pressure of the gas in said gas storage means for providing a signal to control the position of said valve.

4. An assembly as set forth in claim 2 including control means for controlling the movement of said valve between said first and second positions.

5. An assembly as set forth in claim 4 including sensing means for sensing the pressure of the gas in said gas storage means while being charged for providing a signal to said control means to move said valve from said first position to said second position.

6. An assembly as set forth in claim 5 wherein said liquid storage means is disposed above said dispensing means for charging said dispensing means with liquid moving under the force of gravity from said liquid storage means to said dispensing means.

7. An assembly as set forth in claim 6 including a flow control valve for controlling the rate of flow of liquid from said liquid storage tank to said dispensing means.

8. An assembly as set forth in claim 7 wherein said dispensing means includes at least one nozzle means for spraying liquid and conduit means interconnecting said fourth port in said valve and said nozzle means.

9. An assembly as set forth in claim 8 wherein said control means includes a solenoid for controlling the position of said valve.

10. A headlamp washing assembly comprising: nozzle means for directing liquid over a predetermined area; a liquid storage reservoir for storing cleaning liquid to be dispensed by said nozzle means; a gas storage tank for storing gas to force liquid through said nozzle means; a source of gas for supplying pressurized gas to said gas storage tank; a multi-ported valve with a first port in communication with said liquid storage reservoir, a second port in communication with said gas storage tank, a third port in communication with said source of gas and a fourth port in communication with said nozzle means; said valve having a first position for charging said gas storage tank from said source of gas while simultaneously charging said nozzle means with liquid from said liquid storage tank and a second position for subjecting said nozzle means to gas from said gas storage tank to force liquid through said nozzle means.

11. An assembly as set forth in claim 10 including control means for controlling the movement of said valve between said first and second positions, and sensing means for sensing the pressure of the gas in said gas storage means while being charged for providing a signal to said control means to move said valve from said first position to said second position.

12. A fluid dispensing assembly comprising:

liquid storage means for storing liquid;

gas supply means for repeatedly supplying a predetermined quantity of gas;

dispensing means for containing a predetermined quantity of said liquid and for dispensing the liquid over a predetermined area; and a single multiported valve having a first port in communication with said liquid storage means, a second port in communication with said gas supply means, a third port in communication with said dispensing means and a fourth port in communication with a source of gas, said valve having a first position for charging said dispensing means with said liquid from said liquid storage means and for charging the gas supply means with the predetermined quantity of gas from the gas source, and said valve having a second position for discontinuing said charging of said dispensing means and said charging of the gas supply means while simultaneously subjecting said dispensing means to said predetermined quantity of gas from said gas supply means to force said liquid through said dispensing means.

13. An assembly as set forth in claim 12 in which said dispensing means includes conduit means extending between said valve and said predetermined area and further including control means for controlling the movement of said valve between said first and second positions.

14. An assembly as set forth in claim 12 wherein said liquid storage means is disposed above a portion of said dispensing means for charging said portion with liquid moving under the force of gravity from said liquid storage means to said portion of said dispensing means and wherein said dispensing means includes at least one nozzle means disposed above said liquid storage means for dispensing said liquid as a spray.

* * * * *